United States Patent [19]

Kuhn

[11] Patent Number: 5,445,236
[45] Date of Patent: Aug. 29, 1995

[54] VEHICLE

[75] Inventor: Sieghart Kuhn, Eschlohner Str. 36, D-4286 Südlohn, Germany

[73] Assignees: Sieghart Kuhn; Bernhard Hotzel, both of Germany

[21] Appl. No.: 987,269

[22] PCT Filed: Aug. 16, 1991

[86] PCT No.: PCT/EP91/01559
§ 371 Date: Jan. 27, 1994
§ 102(e) Date: Jan. 27, 1994

[87] PCT Pub. No.: WO92/04205
PCT Pub. Date: Mar. 19, 1992

[30] Foreign Application Priority Data

Aug. 30, 1990 [DE] Germany ............ 40 27 480.2

[51] Int. Cl.6 ............ B62D 53/04; B62D 61/12
[52] U.S. Cl. ............ 180/14.1; 180/12; 180/209; 280/403; 280/43.2; 280/43.23; 280/43.18
[58] Field of Search ............ 180/11, 12, 14.1, 14.2, 180/14.3, 14.4, 14.7, 24.02, 209; 280/423.1, 400, 424, 402, 403, 405.1, 43, 43.17, 43.2, 43.23, 47, 43.18

[56] References Cited

U.S. PATENT DOCUMENTS

| 2,380,765 | 7/1945 | Keith | 180/14.1 X |
| 2,480,047 | 8/1949 | Reinhard | 180/12 |
| 2,587,624 | 3/1952 | Johnson | 280/43.11 |
| 3,586,119 | 6/1971 | Fullerton et al. | 180/12 X |
| 3,719,244 | 3/1973 | Miller et al. | 180/14.1 |
| 3,825,089 | 7/1974 | Murphy | 180/12 |
| 4,351,404 | 9/1982 | Igarashi | 180/12 X |
| 4,513,837 | 4/1985 | Archer | 180/209 |
| 4,848,831 | 7/1989 | Buday | 180/12 X |

FOREIGN PATENT DOCUMENTS

| 0010019 | 4/1980 | European Pat. Off. |
| 1499307 | 10/1967 | France |
| 2087488 | 12/1971 | France |
| 2543493 | 10/1984 | France |
| 0867057 | 12/1952 | Germany |
| 3009284 | 9/1981 | Germany |
| 3129203 | 2/1983 | Germany |
| 3336014 | 4/1985 | Germany |
| 8703519 | 9/1987 | Germany |
| 0963781 | 7/1964 | United Kingdom |
| 0976745 | 12/1964 | United Kingdom |
| 2006130 | 5/1979 | United Kingdom |

OTHER PUBLICATIONS de Gruyter, Walter, Herausgegeben von Gustav Goldbeck, *Automobiltechnisches Handbuch*, pp. 577–578, Berlin, New York, 1979.

Primary Examiner—Eric D. Culbreth
Assistant Examiner—F. Zeender
Attorney, Agent, or Firm—Rogers & Killeen

[57] ABSTRACT

In a vehicle combination, a traction vehicle which can be used independently of the combination, is rigidly connected with a trailer vehicle. The rear wheels of the traction vehicle can be lifted from the road when the combination is coupled, the wheels of the traction vehicle being located at the ends of link rods pivoting about an axis and the link rods are connected with a pivoting driving system capable both of lifting the wheels from the road and providing a high quality rolling structure for the traction vehicle.

24 Claims, 5 Drawing Sheets

VEHICLE

The present invention is directed to a vehicle as specified in the opening part of claim 1.

A vehicle of the mentioned species has been proposed in U.S. Pat. No. 3,719,244 in order to eliminate the physical operating drawbacks of a combination composed of a traction vehicle and a trailer universally coupled thereto through a drawbar, while the disadvantages of a large-volume vehicle need not be put up with, such disadvantages resulting mainly from poor maneuverability and considerable parking space requirements during short-range drives. With the known vehicle the rear wheels of the traction vehicle must be lifted by separate lifting means. Also, driving of the rear axle of the traction vehicle while uncoupled from the trailer is impossible.

The fundamental problem on which the proposals known from the prior art publications are based can be observed, for instance, in the case of caravans. For practical use, two different basic types of such vehicles have become widely accepted. The one basic type is the known combination comprising a traction vehicle which is generally a passenger car, and a camper. Such a combination offers the advantage that the camper may be disconnected when it is not required so that the passenger car may be utilized without limitations for instance at the vacation place. The drawback of combinations resides in their comparatively poor handling performance. Due to the additional degree of freedom about the vertical axis which extends through the drawbar coupling, so-called bending angle vibrations are made possible which promote jackknifing of the camper etc. Consequently, in most countries camper combinations are generally subject to speed limitations.

Another common type of vehicle are the so-called camping cars. Such camping cars can be driven more easily and stably than combinations and also offer the advantage that the persons in the traction vehicle may go to the living area even while travelling, which is impossible with combinations already for statutory reasons. Of course, the drawbacks of a camping car reside in the considerable space requirements, the large weight, the consequent lack of parking space, high fuel costs etc., such drawbacks indeed prevailing when a smaller vehicle would be quite sufficient.

German Utility Model Specification 8,703,519 proposes a vehicle assembly in which, by way of an extension and compression-proof connecting means rigidly mounted on the body end of a passenger car used as traction vehicle, a trailer can be rigidly coupled with said passenger car. One of the drawbacks of this vehicle assembly resides in that the rear axle of the traction vehicle and the single axle of the trailer must be closely adjacent each other in the coupled state because by fiction of law only axles with a centre distance of not more than 1 m are considered as a single axle. However, only a design which satisfies this restriction will result in a marketable vehicle unit, because a vehicle unit provided with a total of three independent axles (with centre distances of more than 1 m) must not be driven with a normal driver's licence for passenger cars. Larger vehicle units cannot be realized in accordance with this structural principle, because heavier vehicles require greater centre distances of the axles.

Similarly, DE-OS 3,129,203 proposes to couple a single-axle trailer with a conventional traction vehicle in such a way that the rear axle of the traction vehicle and the axle of the trailer are disposed at a centre distance of less than 1 m.

In British Patent Specification 2,006,130 the specified drawbacks have been avoided. With this construction a single-axle trailer is connected by way of an elongated rigid drawbar with a front wheel-driven traction vehicle, wherein on the one hand the drawbar is rigidly connected with the body platform and on the other hand roof portions of trailer and traction vehicle are rigidly connected in such a way that the rearward structure of the traction vehicle inclusive of rear axle and rear wheels is elevated. In this way there results a rigid vehicle unit in which the rear axle including the wheels of the traction vehicle are lifted off the road surface. One of the drawbacks of this design is the complex structure and operation of the coupling, and another one is the detrimental influence on the centre of gravity of the vehicle combination when the rearward structure of the traction vehicle is elevated.

Finally, U.S. Pat. No. 3,825,089 proposes a vehicle combination in which subsequent to coupling of the traction vehicle and the trailer the rear axle of the traction vehicle is elevated completely while the traction vehicle remains in its horizontal position. It is a drawback of this structure that the entire rear axle is elevated, which on the one hand necessitates a solid-axle suspension system, and an unfavourable displacement of the centre of gravity is also caused thereby. The physical operating drawbacks of a solid rear axle do not permit its employment in high-grade passenger vehicles. Therefore, the known construction is unsuited, for instance, for use in the combination of a comparatively fast traction vehicle and a camper.

German Patent Specification 867,057 discloses an apparatus for automatically lifting the wheels of a truck axle off the road surface by means of suspension links which are pivotable about the axle and have the wheels mounted on the free ends thereof, and by means of a swivel drive with an hydraulic cylinder acting on an axle shaft through a rack-and-pinion means.

Finally, DE-A1-3,009,284 discloses a trailer coupling with a coupling jaw on the traction vehicle and a drawbar projection on the trailer, said drawbar projection being pivotable relative to the coupling jaw; all of the plug-in connections for power transmission and power supply to the trailer are integrated in a common coupling connector. A limit switch provides the driver with information upon completion of coupling.

It is the object of the present invention to provide a vehicle combination of the kind known from U.S. Pat. No. 3,719,244 in which the rear wheels of the traction vehicle can be elevated without any variation of the normal vehicle heights or levels, especially the position of the rearward structure, and without any unnecessary displacement of the centre of gravity so that a simple design and operation of the rigid interlocking coupling between traction vehicles and trailer becomes possible. Moreover, the construction is intended to permit the realization of a high-grade rear axle structure of the traction vehicle and, in addition to that, of a rear wheel drive. Finally, in a vehicle combination of the above-described kind an optimum brake function both in the coupled and the uncoupled condition is to be ensured. The specified object is achieved by claim 1.

Advantageous embodiments of the invention are set out in the dependent claims.

In the vehicle combination of the present invention the rear wheels of the traction vehicle in the state coupled to the trailer can be lifted off the road by operation of the swivel drive without any change in the position of the rearward structure and the rear axle and without any restrictions imposed on the design of the chassis of the traction vehicle.

Since the planes of traction vehicle and trailer remain unchanged both in the coupled and the uncoupled condition it is possible to realize a rigid coupling of simple structure and easy handling.

Due to the design of the suspension system for the rear wheels of the traction vehicle it is possible to optimize the characteristics of wheel position such as toe-in and toe-out, camber, caster and the wheel lifting curve while the capability of the wheels to be lifted off the road in the coupled condition is not affected. Previously, the possibility of lifting the wheels off the road had to be paid for by the use of a solid axle with its inherent operational drawbacks and by the necessity of elevating the wheels by lifting the solid axle off the road, resulting in an unnecessary reduction of useful cargo space in the vehicle.

In view of the solid rigid coupling of both vehicles the legislator permits the stay of persons in the trailer while travelling. In accordance with a further improvement of the present invention sliding doors may be provided in mutually opposed walls of both vehicles so as to permit passage from one vehicle to the other.

In a preferred embodiment of the present invention, the suspension links on which the rear wheels of the traction vehicles are mounted are configured as longitudinal control arms and adapted to be swivelled about a common axis which is parallel to the vehicle transverse axis. Such an arrangement offers the advantage that the swivel device for swivelling the suspension links and for lifting the wheels off the road can be designed with particular simplicity.

Within the scope of the present invention it is also conceivable that the coupling elements for coupling traction vehicle and trailer are configured such that coupling and uncoupling can be performed with optimum ease and comfort.

In a preferred embodiment of the invention as specified in claim 11 the trailer unit comprises two coupling arms which are constituted by portions of the trailer frame rails and which cooperate with coupling jaws integrated in the bumper of the traction vehicle. Such an embodiment offers the advantage that traction vehicle and trailer can be coupled together very easily, both vehicles always remaining in the same plane during coupling and uncoupling. In a further particularly advantageous improvement of the vehicle combination of the present invention, electrical and hydraulic connecting members are integrated in the coupling arms of the trailer and the coupling jaws of the traction vehicle, respectively, so that subsequent to the coupling together of traction vehicle and trailer both vehicles are automatically interconnected electrically and hydraulically so that signalling means such as stop lights, direction indicator lights and the trailer brake system may be operated from the traction vehicle without any additional measures. In this connection, the configuration of the vehicle combination according to claim 16 is particularly significant. This configuration ensures that even with the interlocked vehicle unit braking with two brake circuits similar to a single vehicle is guaranteed so that legal requirements are met.

In a further preferred embodiment the wheel suspension elements of the trailer are configured just like those of the rear wheels of the traction vehicle. It is thus possible, if required, to provide for driving of the trailer wheels and also to effect level control which enables lowering onto the road for loading and unloading.

Below, the present invention will be explained in detail with reference to the drawings, in which.

Figure 1:
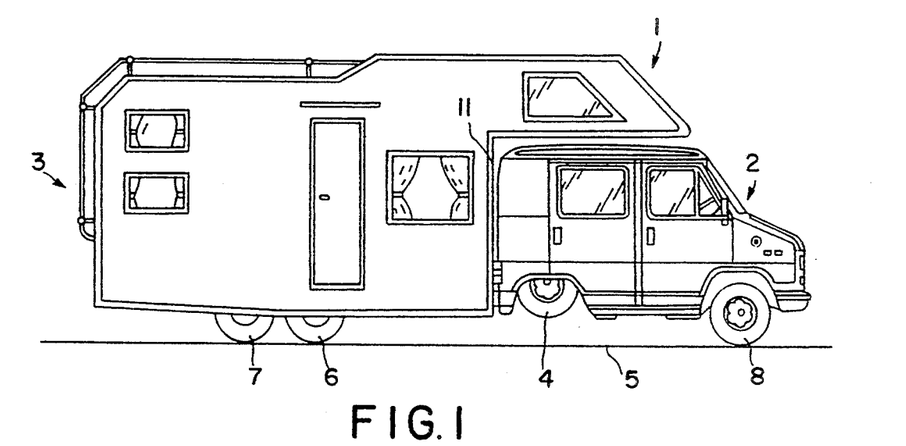
FIG. 1 is a vehicle in accordance with the invention in coupled condition.

FIG. 1 shows a vehicle 1 in coupled condition. It comprises a front-wheel driven traction vehicle 2 and a trailer 3 which in the present embodiment is a camper unit. The traction vehicle 2 comprises a pair of rear wheels 4 which in the coupled state are lifted off the road surface 5. The trailer 3 comprises two pairs of wheels 6 and 7, the centre distance between the two pairs of wheels preferentially being less than 1 m, although it may be greater so as to obtain a desirable weight distribution over the various axles. The traction vehicle 2 comprises two driven and steered front wheels 8 which also constitute the front wheels of the coupled vehicle. The wheel pairs of the trailer 3 constitute the rear wheels for the entire vehicle combination 1. The coupled vehicle combination is rigid and torsion resistant and exhibits all of the physical operation advantages of a one-piece vehicle.

Figure 4:
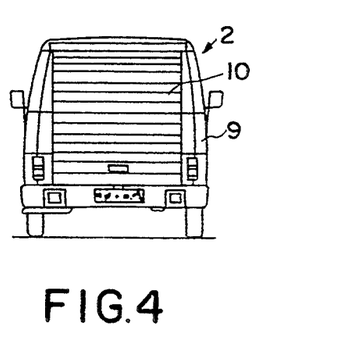
FIG. 4 is a rear view of a traction vehicle for a vehicle combination of the present invention.

As will be apparent from FIG. 4, the vertically disposed rear wall 9 of the traction vehicle includes a door 10 of a roller shutter type capable of being opened when the traction vehicle is coupled with the trailer 3. Likewise, the trailer includes a roller shutter-type door (not illustrated) in its front side 11 facing the traction vehicle and similarly capable of being opened in the coupled condition so that an unobstructed through-way from the traction vehicle 2 into the trailer or camper 3 is created.

Figure 2:
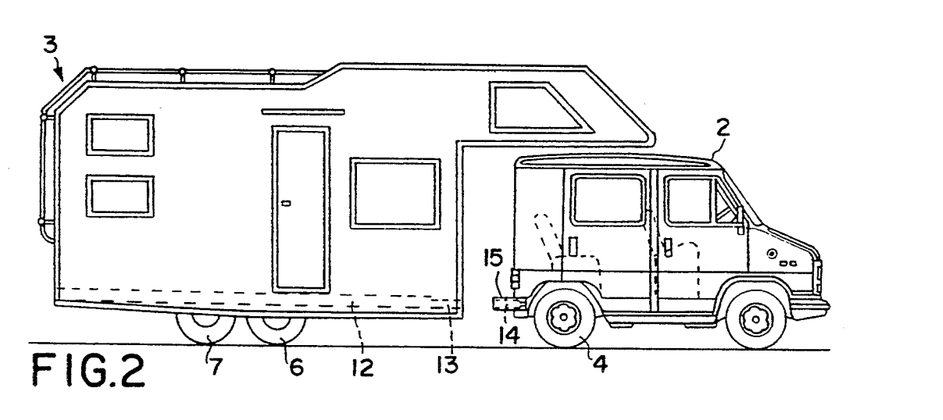
FIG. 2 illustrates the vehicle combination of FIG. 1 in uncoupled condition.

FIG. 2 illustrates the vehicle combination shown in FIG. 1 in the uncoupled condition. The rear wheels 4 of the traction vehicle 2 are now in the normal position so that the traction vehicle may be used independently of the trailer 3. The rear wheels 4 of the structure of the present invention may also be driven wheels so that, if desired, an off-the-road vehicle is available. The trailer 3 is parked on its two pairs of wheels 6 and 7, and optionally it is possible to use supporting members (not illustrated herein). FIG. 2 indicates in dashed lines two frame rails 12 shown one behind the other in the side view which at their front ends terminate in coupling arms 13. In the coupled condition the coupling pins 13 engage in coupling jaws 14 integrated in a bumper 15 of the traction vehicle 2. The coupling jaws 14 and the bumper 15, respectively, are fixedly joined to the non-illustrated frame of the traction vehicle 2 so that a torsion resistant unit is formed when the coupling of traction vehicle and trailer has been completed.

Figure 3:
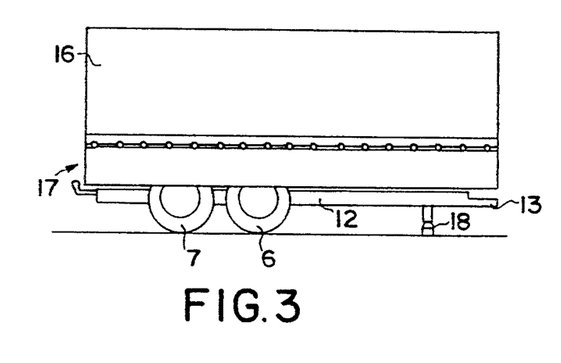
FIG. 3 shows a modification of a trailer for a vehicle combination of the present invention, the modification being suited for carrying goods.

FIG. 3 shows an alternative of a trailer for a vehicle combination of the present invention, in which a superstructure 16 is mounted on top of a frame 12 having coupling arms 13. The trailer 17, which is illustrated in the uncoupled condition, also has two pairs of wheels 6 and 7 and is supported on one or several supporting rollers 18.

Figure 5:
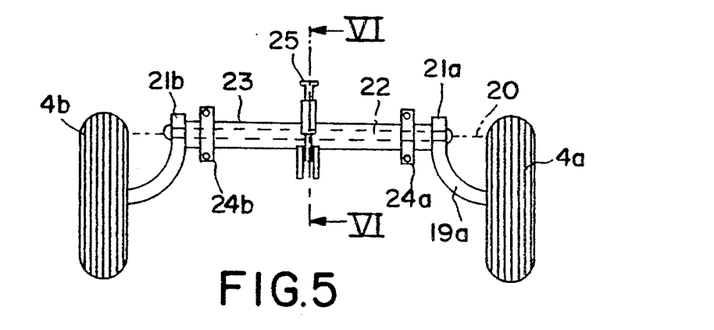
FIG. 5 is a plan view showing the rear suspension system with swivel device of the traction vehicle illustrated in FIGS. 1, 2 and 4.

FIG. 5 illustrates in plan view a rear suspension system for the traction vehicle 2. The right rear wheel 4a and the left rear wheel 4b are each suspended from towed longitudinal control arms 19a and 19b. The longitudinal control arms 19a and 19b are rotatable about the common axis 20 which is parallel to the vehicle transverse axis. The ends 21a and 21b of the longitudinal control arms 19a and 19b are supported in bearings (not illustrated) and connected to a torsion bar 22 disposed on the rotational axis 20. The torsion bar 22 is disposed within an axle tube 23 to the ends of which bearings (not illustrated) are secured for supporting the ends 21a and 21b of the longitudinal control arms 19a and 19b. The axle tube 23 itself is connected to the frame of the traction vehicle by means of clamps 24a and 24b. A swivel device 25 is disposed in the plane of symmetry extending between the wheels 4a and 4b, said swivel device having its one end connected to the torsion bar 22 while the other end is connected to the vehicle body.

Figures 6, 7:
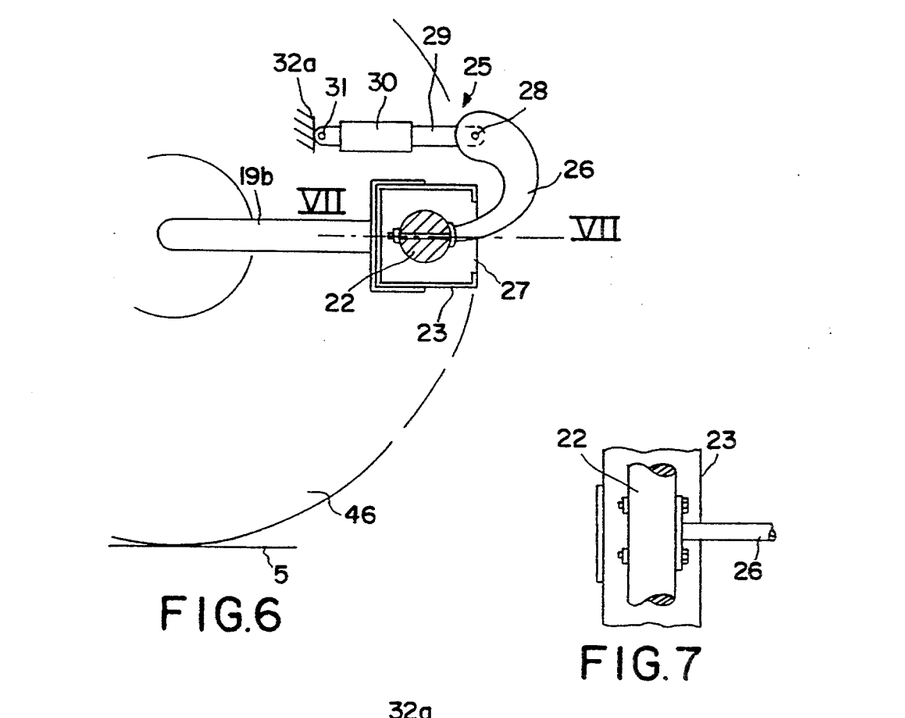
FIG. 6 is a section through a swivel device of the present invention along the line VI—VI in FIG. 5.
FIG. 7 is a section along the line VII—VII in FIG. 6.

FIG. 6 is an enlarged sectional view along the line VI-VI of FIG. 5 showing the swivel device. The left rear wheel 4b and the longitudinal control arm 19b are merely indicated. The torsion bar 22 is connected to a lever 26 by means of two screw connections illustrated in FIG. 7. The lever 26 extends to the outside through an opening 27 formed in the axle tube 23 and has arcuate shape. The end of the lever remote from the torsion bar 22 is connected to the piston rod 29 of an hydraulic lifting cylinder 30. The lifting cylinder 30 is supported through a joint 31 on the frame 32 of the traction vehicle 2.

When the wheel 4b is deflected upwardly by a bump in the road 5 it will move under positive guidance by the longitudinal control arm 19b on a circular arc about the axis 20. The longitudinal control arm 19b acts like a crank on the torsion bar 22 which is twisted right to its centre plane. In the centre plane it is prevented from further twisting by means of the screw connection illustrated in FIG. 7 and the lever 26 which bears against the frame 32 through the piston rod 29, the lifting cylinder 30 and the joint 31. Therefore the other half of the torsion bar 22 extending to the right rear wheel 4a remains in a non-loaded state so that any mutual influence between the rear Wheels 4a and 4b is prevented. When it is desired in the coupled condition of the vehicles to lift the wheels 4a and 4b off the road 5, the lifting cylinder 30 hydraulically extends the piston rod 29 so that the lever 26 and therefore the torsion bar 22 will turn towards the front end, i.e. clockwise as viewed in FIG. 6. Together with the turning movement of the torsion bar 22 the longitudinal control arms 19a and 19b fixedly connected thereto will also be moved, and it is a specific advantage that no spring forces need be overcome due to the direct linking of the lever 26 to the torsion bar. Driving of the hydraulic lifting cylinder 30 may be effected automatically as soon as the vehicles are coupled to each other.

Figure 8:
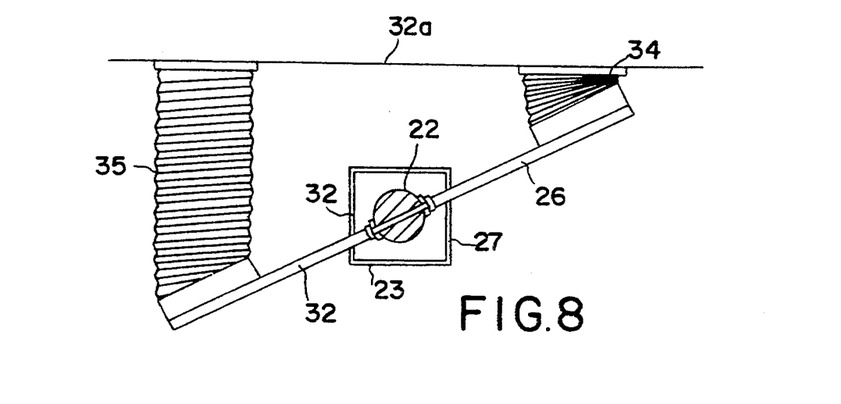
FIG. 8 is a modification of a swivel drive for a wheel suspension according to FIG. 5.

FIG. 8 illustrates a modification for twisting the torsion bar 22 disposed in the axle tube 23. In this case, the axle tube 23 is formed with two openings 27 and 32. Levers 26 and 33 extend through the openings 27 and 32, and pneumatic bellows 34 and 35 are disposed on the ends of the levers remote from the torsion bar 22. The bellows 34 and 35 bear against the frame 32 of the traction vehicle 2. When the wheels are to be lifted off the road 5 pressurized air is applied to the bellows 34 so that the torsion bar 22 is twisted via the lever 26. When the wheels are to be lowered pressure is released from the bellows 34 while pressurized air is applied to the bellows 35. The torsion bar 22 is then returned to its initial position via the lever 33. It is an advantage of this arrangement that the torsion bar 22 is not rigidly supported through an incompressible medium as in the case of the hydraulic lifting cylinder 30 but that an additional spring action is created by supporting the torsion bar via the pneumatic bellows 34 and 35, respectively. In certain cases it may be possible therefore to dimension the torsion bar 22 somewhat weaker which results in a corresponding reduction in weight.

Figure 9:
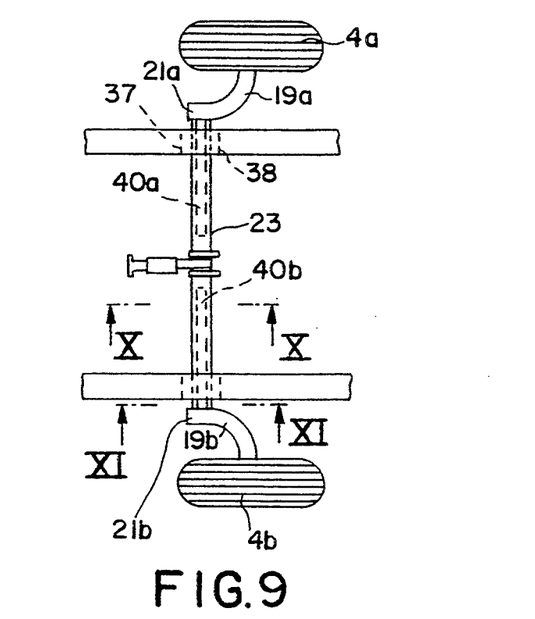
FIG. 9 is a modification of a rear suspension system for a traction vehicle intended for a vehicle combination of the present invention.

FIG. 9 is a plan view of an alternative embodiment of a rear wheel suspension. The rear wheels 4a and 4b are likewise suspended from towed longitudinal control arms 19a and 19b. Also, the ends 21a and 21b of the longitudinal control arms are rotatably supported in bearings mounted on the axle tube 23. In contrast to the embodiment illustrated in FIG. 5, the axle tube is not fixedly connected to the frame 32a but is journalled in two bearings 37. Axial displacement of the axle tube is prevented by a lock washer 38 which is accommodated in a groove formed in the bearing 37.

As indicated in dashed lines in FIG. 9, the ends 21a and 21b of the longitudinal control arms 19a and 19b are respectively connected to profile bars 40a and 40b, each profile bar being somewhat shorter than half the length of the axle tube 23. As will be apparent from FIG. 10, which is a section along the line X—X of FIG. 9, the profile bar 40a has essentially triangular cross-section. Rubber pads 42a, b and c are disposed on the sides of the triangle to bear against the inner wall of the axle tube 23 via positive abutments 43. When the longitudinal control arm and the profile bar connected thereto are twisted, the rubber pads 42a, b and c act as spring elements which react to twisting of the profile bar 40a relative to the axle tube 23 by generating a restoring force. For simple undercarriages the rubber elements may also provide a damping function due to their material absorption.

Figure 10:
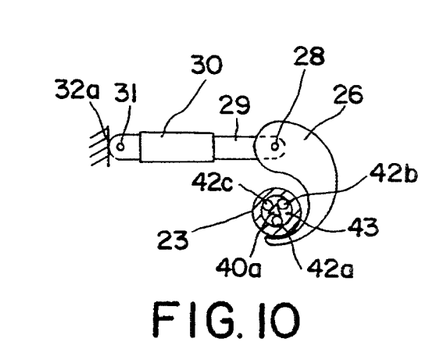
FIG. 10 is a section along the line X—X in FIG. 9.
Figure 11:
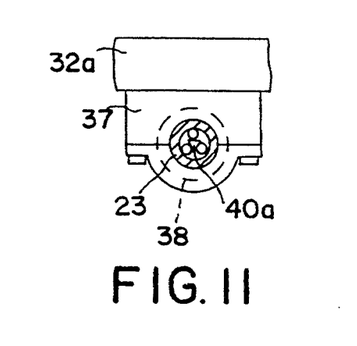
FIG. 11 is a section along the line XI—XI in FIG. 9.
Figure 12:
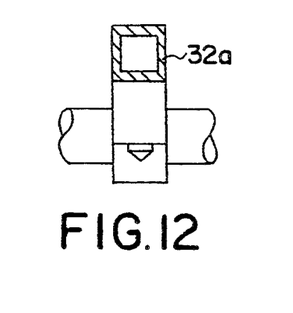
FIG. 12 is a side view of the detail illustrated in FIG. 11.

The axle tube 23 is connected with a lever 26 which at its end 28 remote from the axle tube is connected with the frame 32a of the traction vehicle 2 via a piston rod 29 and an hydraulic lifting cylinder 30 and a link 31.

As will be apparent from FIG. 10 in conjunction with FIG. 9, in the present embodiment the swivel drive in the form of the lifting cylinder 30 and the piston rod 29 is disposed opposite the longitudinal control arms 19 so that the piston rod 29 must be retracted for lifting the wheels 4a and 4b. When the piston rod 29 is retracted by the lifting cylinder 30 the lever 26 and hence the axle tube 23 will move clockwise so that, via the abutments 43, the rubber pads 42a, b and c and the profile bars 40a and 40b, the longitudinal control arms 19a and 19b are turned and the wheels are lifted thereby.

Figure 13:
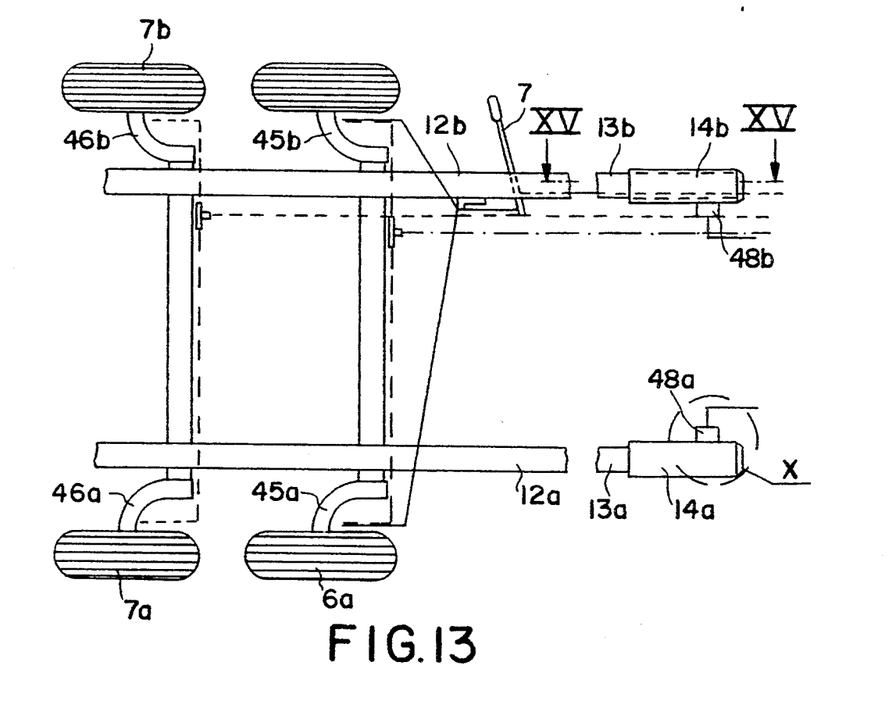
FIG. 13 is a plan view illustrating frame and chassis of a trailer for a vehicle combination of the present invention.
Figure 15:
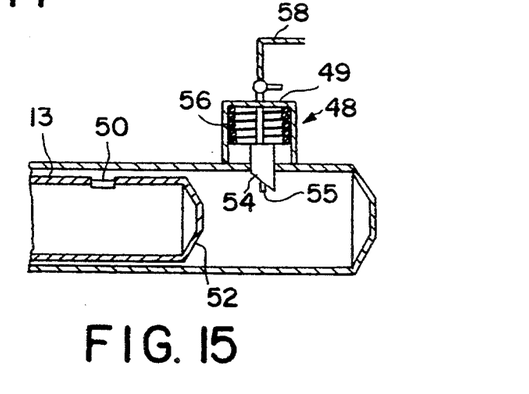
FIG. 15 is a section through a coupling arm plugged into a coupling jaw comprising an automatic locking device.

FIG. 13 illustrates in plan view the undercarriage of the trailer 2 or 17 illustrated in FIG. 1 or FIG. 3, respectively. The wheels 6a and 6b or 7a and 7b, respectively, are guided on towed longitudinal control arms 45a, 45b and 46a, 46b. The frame rails 12a and 12b terminate in coupling arms 13a and 13b which are inserted in coupling jaws 14a and 14b provided on the traction vehicle 2, where they are retained by way of locking means 48a and 48b. The enlarged detail XV is illustrated in FIG. 15.

Figure 14:
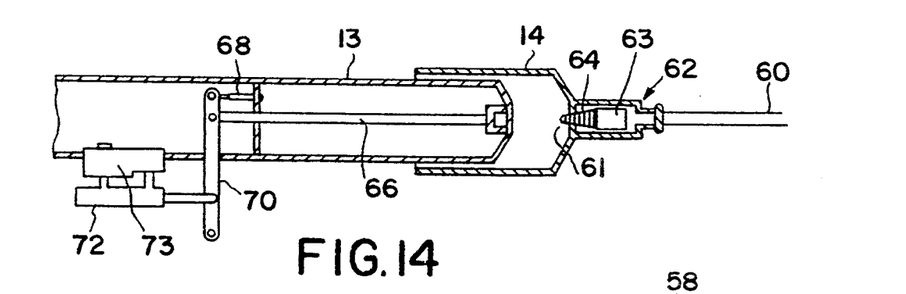
FIG. 14 is a plan view showing a coupling arm and a coupling jaw for a vehicle combination of the present invention.
Figure 16:
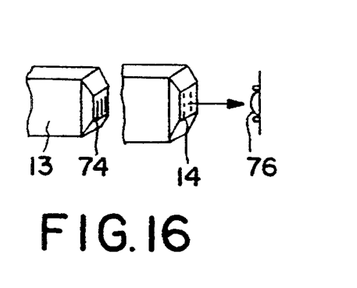
FIG. 16 is an electrical connecting portion disposed between coupling arm and coupling jaw.

A coupling arm 13 is provided with a transverse hole 50 and terminates in a bevelled butting face 52 at the front end of the pin. Preferentially, the cross-section of the coupling arm and of the corresponding coupling jaw 14 may be rectangular or round. On the coupling jaw 14 there is provided a locking device 48 which consists essentially of a spring-loaded bolt having a bevelled butting face 55 on the forward end thereof. When the trailer 3 or 17 is parked horizontally by corresponding alignment of a guide roller 18, the coupling arm 13 will be at the same level as the coupling jaw 14 on the traction vehicle 2. When the driver of the traction vehicle 2 reverses the vehicle the coupling arm 13 or both coupling arms 13 in case of an embodiment comprising two coupling arms, respectively, is/are inserted into the respective coupling jaw, the bevelled butting face 52 deflecting the bolt 54 via the bevelled butting face 55 against the biasing force of a spring 56. As soon as the coupling arm 13 is fully inserted into the coupling jaw 14 the bolt 54 will be in alignment with the hole 50 and will lock in the hole 50 under the action of the spring 56. In this way automatic locking is ensured. As illustrated in FIGS. 14 and 16, the electric circuits of traction and trailer vehicle can be connected and the transmission of brake power can be ensured at the same time.

The bolt 54 may be connected to a linkage 58 so that it may be pulled to a release position, optionally by remote control.

A signal light switch 49 informs the driver via an indicator lamp (not illustrated) in the dashboard of the traction vehicle 2 that the coupling operation has been completed and the coupling made secure.

As shown in FIG. 14, the hollow coupling arm 13 and the coupling jaw 14 are provided in their interior with an hydraulic cylinder 62 and a rod 66 to ensure mechanical/hydraulic transmission of the brake power.

The hydraulic cylinder 62 comprises a piston 63 with a pin 61 projecting in the direction of the coupling arm 13. Pressure is applied to the piston 63 via an hydraulic conduit 60 against the action of a compression spring 64. Upon an increase in pressure within the conduit 60 due to actuation of the hydraulic brake of the traction vehicle 2 through the brake master cylinder the pressure in conduit 60—in the coupled condition of traction vehicle and trailer—is mechanically transmitted via the pin 61 to the rod 66 and hence to the link 70 and to the brake master cylinder 72 of the trailer which also includes a fluid reservoir 73. By means of the pressure developed thus in the brake master cylinder 72 the wheel brake cylinders (not illustrated) of the trailer 3 are actuated. When the brake in the traction vehicle is released the restoring springs in the wheel brake cylinders restore the brake shoes and thus the piston in the brake master cylinder 72, the link 70 and the rod 66 to the brake readiness position.

The pressure in the hydraulic conduit 60 is applied through a third chamber of the brake master cylinder of the traction vehicle, said master cylinder by the way being conceived for a dual circuit brake system of the traction vehicle. Alternatively, such pressure may also be applied through an input cylinder in the traction vehicle which is associated with a commonly used tandem master cylinder for a dual circuit brake system of the traction vehicle. With such a design of the brake system the wheels 4a and 4b of the traction vehicle are also braked irrespective of the fact that in the coupled state these wheels are lifted off the road. Due to the mechanical/hydraulic transmission of the braking pressure from the third chamber of the brake master cylinder or from the input cylinder of the traction vehicle to the brake master cylinder 72 of the trailer, the coupled vehicle combination is braked with a dual circuit brake system as in the case of a unitary vehicle, because even a small hydraulic brake pressure in the traction vehicle is enhanced and directly transmitted to the brake master cylinder 72 of the trailer.

The brake system can be adjusted both initially and during later maintenance by making the rod 66 length-variable. In this way the rod may be set to a length where in the coupled condition the pin 61 will move the rod 66 already at the slightest actuation of the hydraulic brake of the traction vehicle. Due to the brake pressure in conduit 60 the pin 61 may be extended up to ¾ of its length. When the braking operation has been terminated the pin is urged back by the spring 64 into the hydraulic cylinder 62 by about half its overall length. In this way an automatic brake pressure balance is caused in the brake systems of the vehicles 2 and 3.

According to FIG. 16, the end face of one of the two coupling arms 13 is provided with an electrical contact 74 which upon coupling is brought into engagement with a corresponding, tab-like contact 76 in the coupling jaw 14. The contact 76 causes automatic making of the electrical connection between traction vehicle 2 and trailer 3 or 17, respectively. Additionally or alternatively, the trailer may also have a separate power supply.

Figure 17:
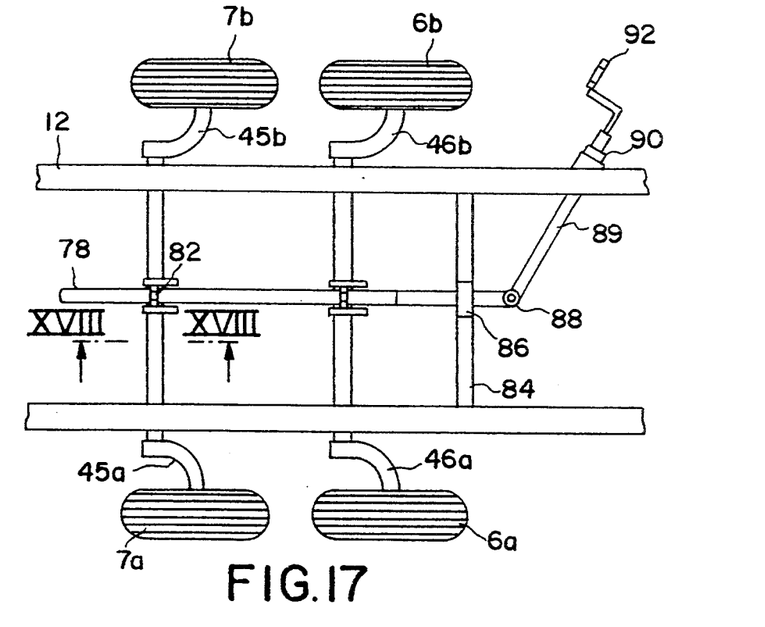
FIG. 17 is a plan view illustrating frame and chassis of a trailer for a vehicle combination of the present invention comprising means for level control.

As shown in FIG. 17, a chassis of the trailer is equipped with two axle assemblies of the kind illustrated and described in FIG. 9; instead of the swivel drive by means of hydraulic lifting cylinders, adjustment is provided by means of a threaded spindle 78.

Of course, it is also possible to employ instead of the manually operated threaded spindle a configuration with a power-assisted lifting cylinder as described with reference to FIGS. 5 to 11.

Figure 18:
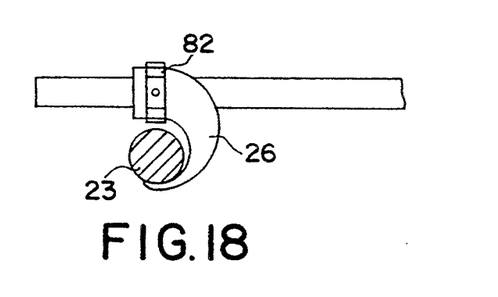
FIG. 18 is a section along the line XVIII—XVIII of FIG. 17.

According to FIG. 18, the lever 26 of each axle which is connected with the axle tube 23 is joined to the threaded spindle by way of a threaded bush 82 pivotable about a swivel joint 80. The threaded spindle 78 is additionally guided in a bearing 86 mounted on a cross arm 84. On the end of the threaded spindle 78 there is mounted a universal joint 88 for connecting the threaded spindle to a shaft 89. The shaft 89 is guided in a bearing 90 and may be rotated by a crank 92. When the shaft 89 is rotated the threaded spindle 78 will also be rotated via the universal joint 88. The position of the threaded spindle 78 is fixed by means of the bearing 86 relative to the frame or the frame rails 12 of the vehicle. When the threaded spindle 78 is rotated the threaded bushes 82 will therefore be moved relative to the vehicle frame so that the lever 26 is rotated and thus, via the axle tube 23 and the operations explained with reference to FIG. 9, the positions of the longitudinal control arms 45a to 46b relative to the vehicle frame are varied. As the wheels 6a to 7b of the trailer 2 or 17, respectively, rest on the road surface 5 and bear the vehicle weight, rotation of the longitudinal control arms 45a to 46b will not result in a lifting or lowering of the wheels but in a lifting or lowering of the entire vehicle. In this way a desired levelling and hence adaptation to different load conditions may be realized. For purposes of loading and unloading it is also possible to lower the trailer completely onto the ground.

For the very first time, the vehicle of the present invention enables a combination of a traction vehicle and a trailer which can be coupled and uncoupled in a simple, rapid and comfortable way and in which the rear wheels of the traction vehicle which are not required in the coupled state can be lifted off the road surface without also elevating the rear axle, while the loading space in the traction vehicle is not reduced and an inferior-quality chassis construction of the traction vehicle need not be put up with.

I claim:

1. A vehicle comprising a traction vehicle (2) having driven front wheels (8), rear wheels, and a brake circuit, which by way of a coupling assembly which includes at least one coupling jaw (14) fixedly mounted on the traction vehicle, is adapted to be rigidly coupled in an operative connection with at least one coupling arm (13) one a trailer (3) having at least two wheels and a brake circuit wherein in the coupled state the rear wheels of the traction vehicle which are suspended from suspension links (19a, 19b) are lifted off the road surface and the operative connection between the at least one coupling jaw (14) and the at least one coupling arm (13) is locked automatically upon coupling, and the rear wheels (4) of the traction vehicle (2) are lifted by a swivel drive common to both suspension links (19a, 19b) when the coupling operation has been completed, the operative connection comprising electrical contacts integrated in the at least one coupling jaw (14) and the at least one coupling arm (13) for automatically making an electrical connection between the traction vehicle and the trailer upon coupling thereof, upon coupling of the at least one coupling jaw and the at least one coupling arm an operating connection is provided between the brake circuit of the traction vehicle and the brake circuit of the trailer (3), and the lifting of the rear wheels (4) of the traction vehicle after completion of the coupling operation is automatically performed by the swivel drive (25).

2. Vehicle as claimed in claim 1, characterized in that the suspension links are longitudinal control arms (19a,b) adapted to be pivoted about a common axis (20).

3. Vehicle as claimed in claim 2, characterized in that each of said longitudinal control arms is connected with a torsion bar (22) disposed in parallel with said axis (20).

4. Vehicle as claimed in claim 2 or claim 3, characterized in that the two longitudinal control arms (19a,b) which are adapted to be pivoted about a common axis (20) are connected width each other by a centrally disposed torsion bar (22).

5. Vehicle as claimed in claim 2, characterized in that the two longitudinal control arms (19a,b) which are adapted to be pivoted about a common axis (20) are connected with each other by a profiled transverse member.

6. Vehicle as claimed in claim 2, characterized in that the longitudinal control arms (19a,b) are rotatably mounted on the ends of an axle tube (23) and are connected with profiled rods (40a,b) bearing against the inner wall of the axle tube by means of resilient rubber pads (42a,b,c).

7. Vehicle as claimed in claim 3 characterized in that the swivel drive (25) comprises a lever (26) which is connected with the torsion bar (22) and adapted to be swivelled by means of the swivel drive at its end remote from the torsion bar.

8. Vehicle as claimed in claim 5, characterized in that the swivel drive (25) comprises a lever which is connected with the profiled transverse member and which is adapted to be swivelled by means of the swivel drive at its end remote from the profiled transverse member.

9. Vehicle as claimed in claim 6, characterized in that the swivel drive (25) comprises a lever (26) which is connected with the axle tube (23) and which is adapted to be swivelled by the swivel drive at its end remote from the axle tube.

10. Vehicle as claimed in claim 1, characterized in that the swivel drive is a lifting cylinder (30) which is preferentially controlled by an electrically operated hydraulic pump.

11. Vehicle as claimed in claim 1, characterized in that the trailer comprises two coupling arms (13a,b) constituted by extensions of frame rails (12a,b) on the trailer, and that the traction vehicle (2) comprises two mating coupling jaws (14a,b).

12. Vehicle as claimed in claim 11, characterized in that the two coupling jaws (14a,b) are integrated in the rear bumper (15) of the traction vehicle.

13. Vehicle, particularly as claimed in claim 1, characterized in that the traction vehicle (2) includes one of a three-chamber brake master cylinder or a dual-chamber brake master cylinder with an input cylinder such that the traction vehicle in the uncoupled state has a dual circuit brake system, and that in the trailer (3) there is provided a separate brake master cylinder (72) adapted to be actuated through the at least one coupled jaw and the at least one coupled arm by one of the third chamber of the three-chamber brake master cylinder and the input cylinder.

14. Vehicle as claimed in claim 13, characterized in that a coupling arm (13) of the trailer has a rod (66) disposed therein which is actuated by means of an hydraulic cylinder (62) disposed in the coupling jaw (14) for energizing an hydraulic brake cylinder (72) and thus the brake system of the trailer.

15. Vehicle as claimed in claim 14, characterized in that the hydraulic cylinder (62) comprises a pin (61)

which is extended upon actuation of a pedal brake of the traction vehicle in the direction of the trailer (3) so as to ensure permanent readiness to brake.

16. Vehicle as claimed in claim 14 characterized in that the rod (66) of the trailer (3) is variable in length so as to permit an adjustment of the brake system of the trailer (3).

17. Vehicle as claimed in claim 15 characterized in that upon release of the pedal brake, the rod (66) and thus the pin (61) are pushed back into the hydraulic cylinder (62) to the readiness position thereof by the restoring springs of the wheel brake cylinders of the trailer (3).

18. Vehicle as claimed in claim 1 wherein the trailer comprises wheel suspension links with longitudinal control arms (45a,b) that are rotatably mounted on the ends of an axle tube (23).

19. Vehicle as claimed in claim 18, characterized in that the suspension links of the trailer include a swivel drive for rotating the suspension links, the trailer swivel drive is connected to a means through which the rotation of the suspension links can be utilized for level control of the trailer.

20. Vehicle as claimed in claim 1, characterized in that the at least one coupling arm of the trailer has a transverse hole (50) and that the at least one mating coupling jaw (14) includes therein a spring-loaded pin (54) with a butting face (55), said pin upon insertion of the at least one coupling arm into the at least one coupling jaw being pushed back against the biasing action of a spring (56) and latching in said transverse hole (50) of the at least one coupling arm (13) for automatic locking therein.

21. Vehicle as claimed in claim 1, characterized in that the traction vehicle comprises a rear wall having a door (10) and that a front wall of the trailer is likewise provided with a door so as to create a through-way between traction vehicle and trailer in the coupled state thereof.

22. Vehicle as claimed in claim 21, characterized in that the door (10) of traction vehicle and the doors of the trailer are designed as sliding doors.

23. The vehicle as claimed in claim 18 wherein said trailer further comprises a lever (26) that is connected with the axle tube (23) and which is adapted to be swiveled to thereby elevate the axle tube (23).

24. The vehicle as claimed in claim 23 wherein said trailer further comprises a threaded spindle (78) for swiveling the lever (26).

* * * * *